US009216360B2

United States Patent
Hilton

(10) Patent No.: US 9,216,360 B2
(45) Date of Patent: Dec. 22, 2015

(54) PLUSH ANIMAL ASSEMBLY FOR SUPPORTING A TABLET COMPUTER OR SIMILAR SIZED ITEM

(71) Applicant: Gregory L. Hilton, New York, NY (US)

(72) Inventor: Gregory L. Hilton, New York, NY (US)

(*) Notice: Subject to any disclaimer, the term of this patent is extended or adjusted under 35 U.S.C. 154(b) by 32 days.

(21) Appl. No.: 14/170,641

(22) Filed: Feb. 2, 2014

(65) Prior Publication Data

US 2015/0174498 A1  Jun. 25, 2015

Related U.S. Application Data

(63) Continuation-in-part of application No. 29/477,455, filed on Dec. 22, 2013, now Pat. No. Des. 715,805.

(51) Int. Cl.

| A63H 3/00 | (2006.01) |
|---|---|
| F16M 13/02 | (2006.01) |
| A63H 3/02 | (2006.01) |
| A63H 33/26 | (2006.01) |

(52) U.S. Cl.
CPC ............... *A63H 3/003* (2013.01); *A63H 3/02* (2013.01); *F16M 13/02* (2013.01); *A63H 33/26* (2013.01)

(58) Field of Classification Search
USPC ............ 446/71, 72, 73, 74, 81, 297, 330, 340
See application file for complete search history.

(56) References Cited

U.S. PATENT DOCUMENTS

| 4,950,196 A * | 8/1990 | Fortune et al. ................ 446/73 |
|---|---|---|
| 5,059,149 A * | 10/1991 | Stone .............................. 446/73 |
| 5,072,998 A * | 12/1991 | Oh ................................ 312/204 |
| 5,217,192 A * | 6/1993 | Oktayuren ..................... 248/102 |
| 5,564,209 A * | 10/1996 | Zagnoli ........................... 40/594 |
| 5,601,469 A * | 2/1997 | Yang ............................... 446/73 |
| 5,833,509 A * | 11/1998 | Hunt .............................. 446/73 |
| 6,364,361 B1 * | 4/2002 | Kushner ......................... 281/45 |
| 8,827,760 B2 * | 9/2014 | Ushibo et al. ................. 446/73 |
| 2012/0309256 A1 * | 12/2012 | Theodore ....................... 446/72 |
| 2014/0199911 A1 * | 7/2014 | Shamus .......................... 446/73 |

\* cited by examiner

*Primary Examiner* — Kurt Fernstrom
(74) *Attorney, Agent, or Firm* — LaMorte & Associates, P.C.

(57) ABSTRACT

An assembly for supporting a tablet computer or similar electronic device. The assembly utilizes a plush animal structure as a support stand. The plush animal structure has a torso, legs that extend from the torso to form a lap area, and arms that extend from the torso. The torso, legs and arms define a receptacle area sized to receive and retain the tablet computer. An auxiliary object extends between the legs of the plush animal structure in the lap area. The auxiliary object forms a support surface between the legs in the lap area against which the tablet computer abuts when the tablet computer is in said receptacle area. The support surface is slightly forward of the arms. Consequently, when in the receptacle area, the tablet computer is inclined at a slight angle as it abuts against the support surface.

13 Claims, 3 Drawing Sheets

PLUSH ANIMAL ASSEMBLY FOR SUPPORTING A TABLET COMPUTER OR SIMILAR SIZED ITEM

RELATED APPLICATIONS

This application is a continuation-in-part of co-pending patent application Ser. No. 29/477,455 filed Dec. 22, 2013.

BACKGROUND OF THE INVENTION

1. Field of the Invention

In general, the present invention relates to devices that are used to support tablet computers and similarly sized items. More particularly, the present invention relates to stuffed plush assemblies that are configured to support tablet computers in an inclined orientation.

2. Prior Art Description

Supports for tablet computers have been in existence for as long as there have been tablet computers. Typically, supports for tablet computers are designed to position the screen of the computer at an ergonomical incline. The support may engage the tablet computer to prevent it from separating from the support.

The prior art is replete with various types and styles of computer supports. In order to distinguish computer supports in the marketplace, many computer supports are made to be highly decorative. Additionally, many serve secondary purposes, such a being a pillow or a toy as well as being a computer support. Such prior art supports are exemplified by U.S. Patent Application No. 2012/0309256 to Theodore, entitled Plush Toy Computer Tablet Carrier.

A problem associated with such ornamental computer supports is that although the toy or pillow may support the computer, it does not engage the computer with any significant strength. Accordingly, if the toy or pillow is thrown, kicked, or dropped, the tablet computer can easily dislodge from the support when the support is moved. Since the computer support has the same appearance as a pillow or a plush toy, members of a family can easily forget that a tablet computer is being held within its structure. The computer support is, therefore, often treated merely like a pillow or plush toy and is often thrown, kicked, and dropped from heights.

A need therefore exists for a plush assembly that is designed to hold a tablet computer, wherein the tablet computer is secured within the structure of the support so that it is not readily dislodged by physical movement. This need is met by the present invention as described and claimed below.

SUMMARY OF THE INVENTION

The present invention is an assembly for supporting a tablet computer or similar electronic device. The assembly utilizes a plush animal structure as a support stand. The plush animal structure has a torso, legs that extend from the torso to form a lap area, and arms that extend from the torso. The torso, legs and arms define a receptacle area sized to receive and retain the tablet computer.

An auxiliary object extends between the legs of the plush animal structure in the lap area. The auxiliary object forms a support surface between the legs in the lap area against which the tablet computer abuts when the tablet computer is in said receptacle area. The support surface is slightly forward of the arms. Consequently, when in the receptacle area, the tablet computer is inclined at a slight angle as it abuts against the support surface.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention support assembly can be sized to carry many different items, such as books and magazines, the present invention is most beneficial for carrying electronic devices. The exemplary embodiment illustrated shows the assembly being used to hold a tablet computer. This embodiment is selected in order to set forth one of the best modes contemplated for the invention. The illustrated embodiment, however, is merely exemplary and should not be considered a limitation when interpreting the scope of the appended claims.

Figure 1:
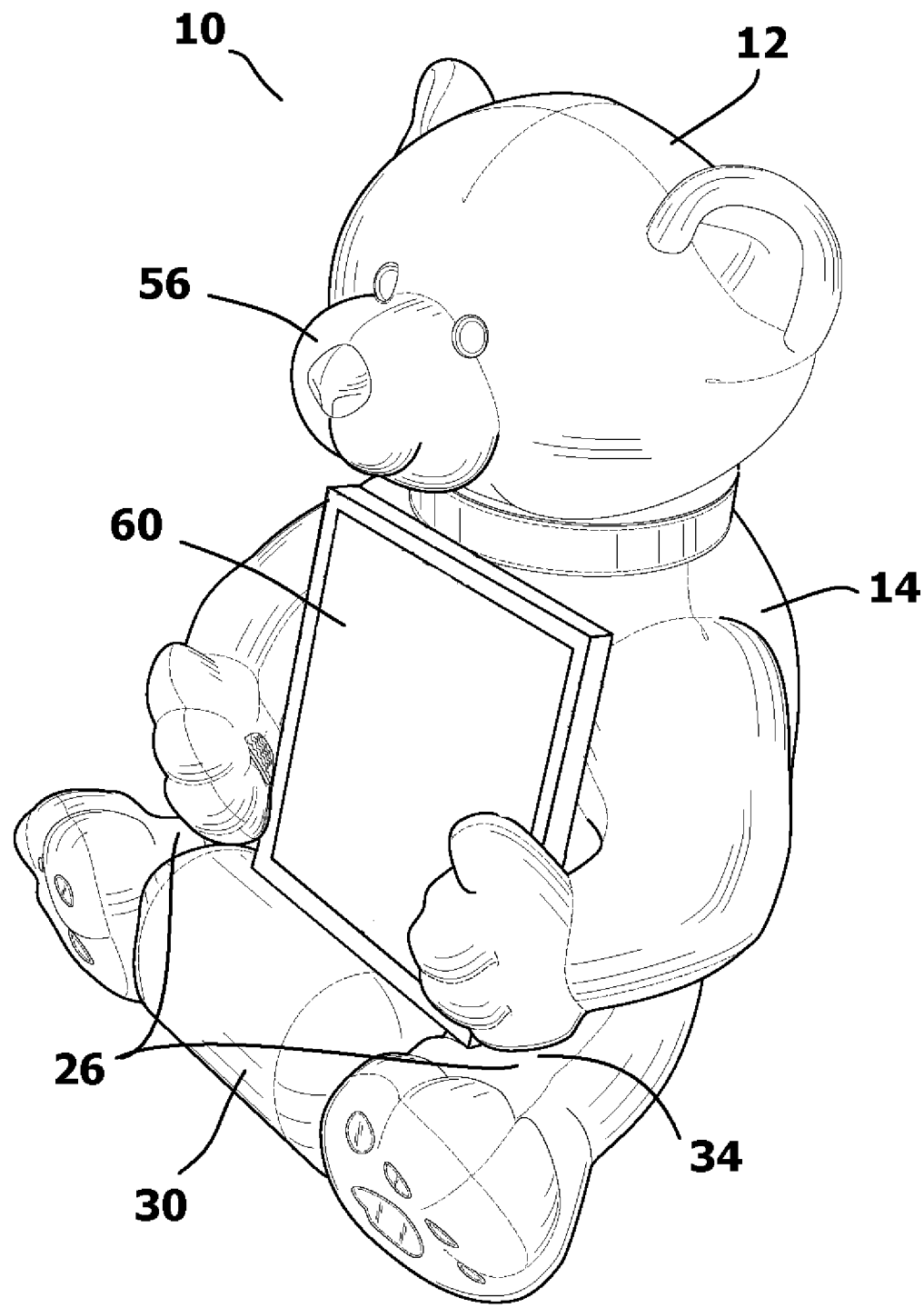
FIG. 1 is a perspective view of an exemplary embodiment of the present invention support assembly holding a tablet computer.
Figure 2:
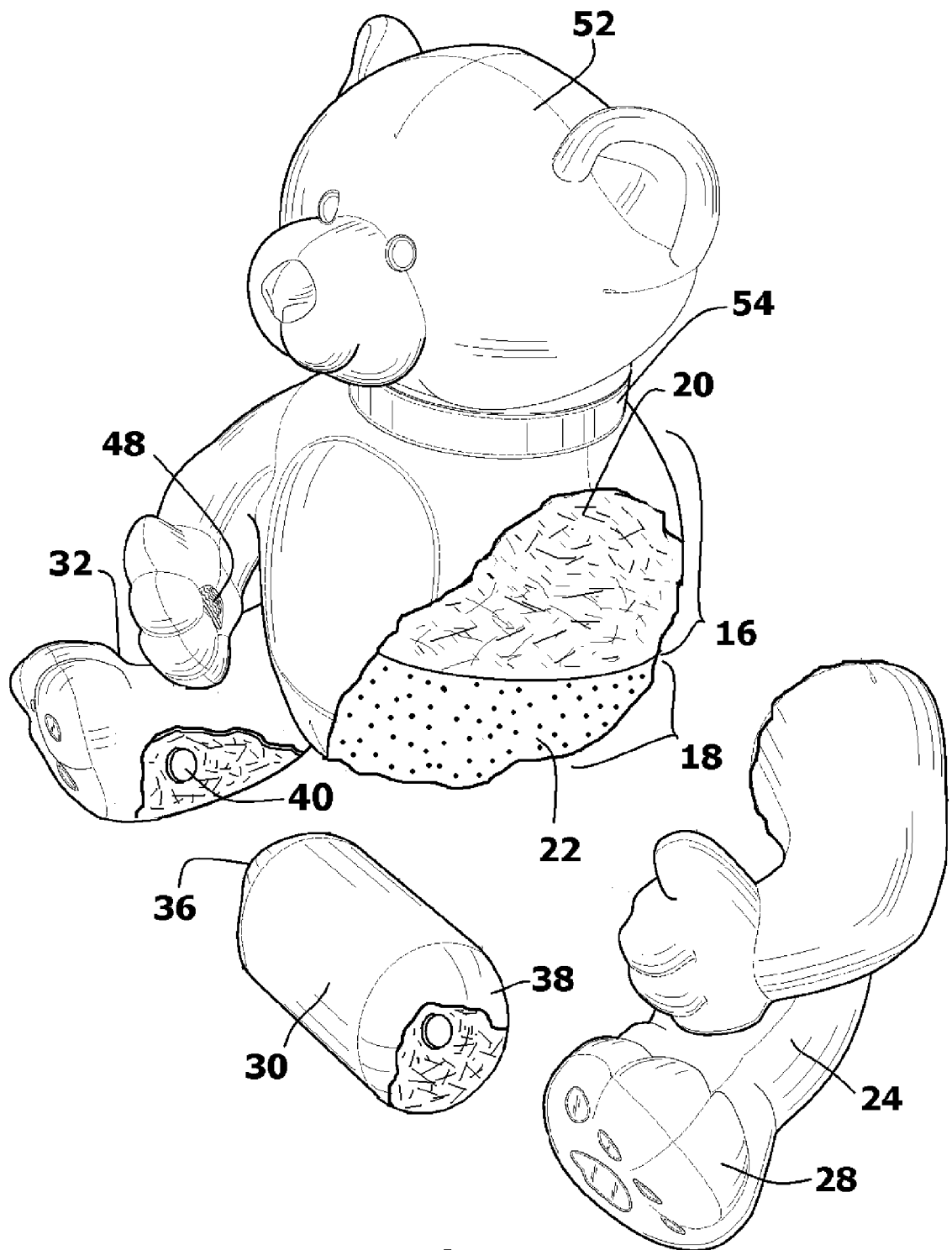
FIG. 2 is a fragmented view of the embodiment of FIG. 1.
Figure 3:
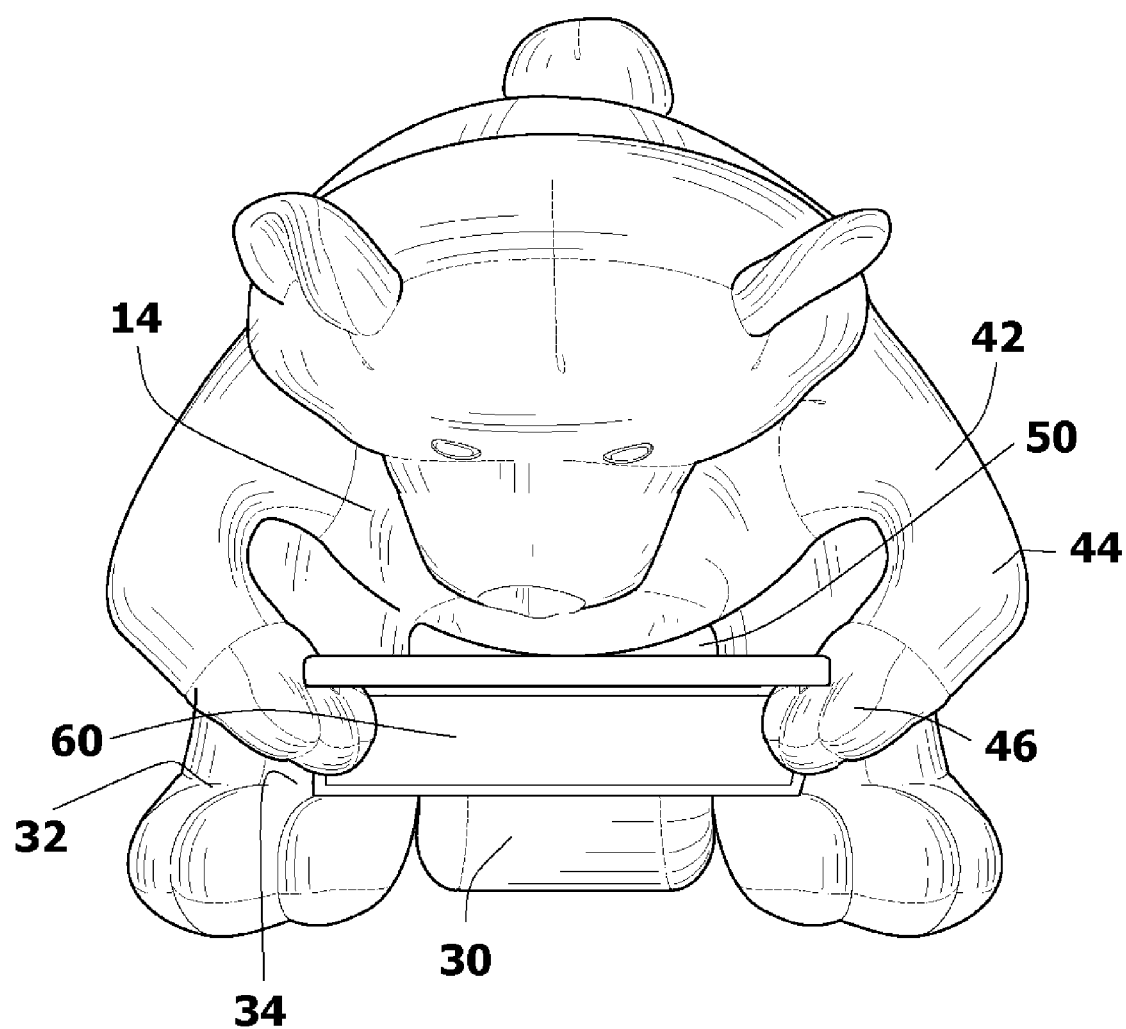
FIG. 3 is a top view of the exemplary embodiment of FIG. 1 showing the support assembly holding a tablet computer.

Referring to FIG. 1 in conjunction with both FIG. 2 and FIG. 3, a support assembly 10 is shown. The support assembly 10 includes a plush animal structure 12. The plush animal structure 12 has a torso 14. The torso 14 has an upper section 16 and a lower section 18. Different fill materials are used to fill the upper section 16 and the lower section 18 of the torso 14. The upper section of the torso 14 is filled with traditional plush filling 20, such as polyester fibers. The lower section 18 of the torso 14, however, is filled with a shape conforming material 22, such as a mass of polystyrene beads. This dual filling serves two primary functions. First, it makes the lower section 18 of the torso 14 heavier than the upper section 16. This lowers the center of gravity of the plush animal structure 12 and makes the plush animal structure 12 highly stable when placed upon a surface. Second, the presence of the conforming material 22 enables the lower section 18 of the torso 14 to be malleable to contact forces. The conforming material 22 enables the plush animal structure 12 to conform to the contours of most any surface upon which the plush animal structure 12 is placed. As such, the plush animal structure 12 can rest on a person's lap, a chair, or a pile of books with equal stability. Furthermore, the presence of the conforming material 22 enables the shape of the torso 14 to be physically altered. As is later explained, a handheld electronic device leans against the torso 14. As such, the conforming material 22 enables the angle of the handheld electronic device to be selectively altered by changing the shape of the torso 14 and thus the lean angle against the torso.

Legs 24 extend from the lower section 18 of the torso 14. The plush animal structure 12 is constructed in a sitting position. As such, the legs 24 extend in front of the lower torso 18 and create a lap area 26. The legs 24 terminate with enlarged foot paws 28. The points where the legs 24 connect to the foot paws 28 creates a ledge 32, which is important to the operation of the support assembly 10.

An auxiliary plush cylinder 30 is positioned between the two legs 14. The auxiliary plush cylinder 30 is preferably made of the same material, in color and type, as are the legs 24. The auxiliary plush cylinder 30 is sized so that it spans between the two legs 24. Furthermore, the exterior curvature of the plush cylinder 30 aligns with the ledge 32 atop the foot paws 28. This creates a straight support surface 34 that extends across the lap area 26 of the plush animal structure 12.

The auxiliary plush cylinder 30 has a first end 36 and a second end 38. The first end 36 connects to the right leg of the plush animal structure 12. The second end 38 connects to the left leg of the plush animal structure 12. The connections are temporary and are made using connectors 40, such as magnetic connectors and/or mechanical connectors, such as snaps or Velcro.

Two arms 42 extend forward from the upper section 16 of the torso 14. Each of the arms 42 bends at a perpendicular at a rigid elbow 44. This provides each of the arms 42 with a hook shape as it extends from the torso 14. The end of each of the arms 42 terminates with a hand paw 46. The arms 42 are rigidly affixed to the upper section 16 of the torso 14. This produces arms 42 that are cantilevered from the torso 14 and extend out in front of the torso 14. Each of the hand paws 46 contains a patch of high friction material 48 on its palm, the purpose of which is later explained.

The torso 14 and the hooked configurations of the arms 42 define a receptacle 50 that is sized and shaped to receive a wide selection of tablet computers. Although a gap exists between the hand paws 46, the receptacle 50 has a generally rectangular shaped cross-sectional profile, defined between the torso 14 and the two opposing hooked arms 42. The receptacle 50 is widest between the inside elbows 44 of the arms 42.

The plush animal structure 12 has a head 52 that is attached to the torso 14 with an elongated neck 54. The head 52 has a salient snout 56. The snout 56 extends out over the area of the receptacle 50.

A tablet computer 60 can be placed into the receptacle 50. Once within the area of the receptacle 50, the tablet computer 60 rests upon the support surface 34 that extends across the lap area 26 of the plush animal structure 12. As such, the bottom of the tablet computer 60 rests upon the legs 24 and is prevented from moving forward on the legs 24 by the abutment with the foot paws 28 and the plush cylinder 30.

The tablet computer 60 extends between the arms 42. If the tablet computer 60 is slightly larger than the area of the receptacle 50 between the arms 42, then the arms 42 will deform to wider positions to accommodate the tablet computer 60. The plush nature of the arms 42 makes the arms 42 flexible, while remaining rigid enough to confine the tablet computer 60. Once within the confines of the arms 42, the tablet computer 60 is prevented from moving laterally by the presence of the arms 42. The tablet computer 60 is prevented by moving backward by the torso 14 of the plush animal structure 12. Lastly, the tablet computer 60 is prevented from moving forward by the hook shape of the arms 42 and the hand paws 46.

Should the plush animal structure 12 be kicked, thrown or dropped, the tablet computer 60 is prevented from sliding out of the top of the receptacle 50 by the presence of the salient snout 56. As such, the tablet computer 60 will not fall out of the support assembly 10 due to any inadvertent manipulation. Furthermore, the hand paws 46 press against the tablet computer 60 and bring the patches 48 of high friction material into contact with the tablet computer 60. This contact prevents the tablet computer from inadvertently shifting or settling out of position in the receptacle 50 by a user.

Once the tablet computer 60 is set into the receptacle 50, it is held firmly in place by the multiple points of contact with the plush animal structure 12. To remove the tablet computer, a person needs to grasp the tablet computer and pull it with enough force to temporarily deform the arms 42 and move the tablet computer 60 through the gap space between the opposing arms 42 and paws 46.

It will therefore be understood that the present invention support assembly 10 can be used to support a tablet computer 60, while keeping the tablet computer 60 secure. Additionally, the assembly 10 can be used to hold the tablet computer 60 at an inclined angle while the tablet computer 60 is being used. The inclined angle comes from positioning the ledge 32 of the foot paws 28 and the support surface 34 of the plush cylinder 30 slightly forward of the arms 42. In this manner, when the tablet computer 60 is placed in the area of the receptacle 50, it is inclined as it contacts the ledge 32 and the support surface 34, while leaning against the torso 14.

It will also be understood that the embodiment of the present invention assembly that is illustrated and described is merely exemplary and that a person skilled in the art can make many variations to that embodiment. For instance, the dimensions of the receptacle defined by the plush animal structure 12 can be varied to match the exterior dimensions of different tablet computers, books, or magazines. All such embodiments are intended to be included within the scope of the present invention as defined by the claims.

What is claimed is:

1. An assembly for supporting a tablet computer, said assembly comprising:
   a plush animal structure having a torso, legs that extend from said torso to form a lap area, arms that extend from said torso, wherein said torso, said legs and said arms define a receptacle area sized to receive and retain a tablet computer; and
   an auxiliary object that extends between said legs of said plush animal structure in said lap area, therein forming a support surface between said legs in said lap area against which said tablet computer abuts when said tablet computer is in said receptacle area,
   wherein said auxiliary object contains magnetic connectors that engage said legs and magnetically interconnect said auxiliary object to said legs.

2. The assembly according to claim 1, wherein said plush animal structure further includes hand paws on said arms and foot paws on said legs, wherein said foot paws align with said auxiliary object to extend said support surface over said legs.

3. The assembly according to claim 1, wherein said auxiliary object is shaped as a cylinder.

4. The assembly according to claim 1, wherein said plush animal structure contains a head and a salient snout that extends outwardly over said receptacle area.

5. The assembly according to claim 1, wherein said torso has an upper area proximate said arms and a lower area proximate said legs, wherein said lower area is filled with a heavier fill material than is said upper area.

6. The assembly according to claim 5, wherein said heavier fill material is a mass of polystyrene beads.

7. An assembly for supporting a tablet computer, said assembly comprising:
   a plush animal structure having a torso, legs that extend from said torso to form a lap area, arms that extend from said torso, wherein said legs terminate with enlarged foot paws and said arms terminate with enlarged hand paws, and wherein said torso, said legs, said arms, said hand paws and said foot paws define a receptacle area sized to receive and retain a tablet computer;
   an auxiliary object that extends between said legs of said plush animal structure in said lap area, therein forming a support surface between said legs in said lap area against which said tablet computer abuts when said tablet computer is in said receptacle area; and magnetic connectors that engage said legs and magnetically interconnect said auxiliary object to said legs.

8. The assembly according to claim 7, wherein said foot paws prevent said tablet computer from moving forward away from said torso when said tablet computer is in said receptacle area.

9. The assembly according to claim 7, wherein said foot paws align with said auxiliary object to extend said support surface over said legs.

10. The assembly according to claim 7, wherein said auxiliary object is shaped as a cylinder.

11. The assembly according to claim 8, wherein said plush animal structure contains a head and a salient snout that extends outwardly over said receptacle area.

12. The assembly according to claim 7, wherein said torso has an upper area proximate said arms and a lower area proximate said legs, wherein said lower area is filled with a heavier fill material than is said upper area.

13. The assembly according to claim 12, wherein said heavier fill material is a mass of polystyrene beads.

\* \* \* \* \*